United States Patent Office 3,632,649
Patented Jan. 4, 1972

3,632,649
**NITROGEN-CONTAINING TERTIARY
PHOSPHINE SULFIDES**
Ludwig Maier, Zurich, Switzerland, assignor to Monsanto
Company, St. Louis, Mo.
No Drawing. Filed Sept. 18, 1967, Ser. No. 668,699
Int. Cl. C07c *91/16*
U.S. Cl. 260—570.5                         1 Claim

ABSTRACT OF THE DISCLOSURE

Compounds of the formula

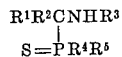

where $R^1$, $R^2$ and $R^3$ ar organic groups which occur in Schiff bases and $R^1$ and $R^2$ can also be hydrogen atoms, $R^4$ and $R^5$ are organic groups or members of heterocyclic groups which occur in secondary phosphine sulfides and a process for making the compounds by reacting a secondary phosphine sulfide with a Schiff base.

The compounds are useful as lubricants and bactericides, and may be exemplified by (α-ethylimino)-benzyl-diphenylphosphine sulfide, (α-allylimino-p-nitrobenzyl-diphenylphosphine sulfide and (α-allylimino)-3,4-dichlorobenzyl-di-n-butylphosphine sulfide.

---

The present invention relates to novel tertiary phosphine sulfides which contain nitrogen and to a process for preparing. These new compounds have the formula

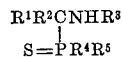

in which $R^1$, $R^2$ and $R^3$ are similar or different organic groups, occurring in Schiff bases, $R^1$ and $R^2$, moreover, can also be hydrogen atoms, and $R^4$ and $R^5$ are similar or different organic groups or members of a heterocyclic group, occurring in secondary phosphine sulfides. Normally the R groups, i.e. $R^1$, $R^2$, $R^3$ etc., are hydrocarbon which may or may not have nitro and/or halogen atom substituents, and usually each R group will not have more than 24 carbon atoms and many times not more than 8 carbon atoms.

It has been found that novel compounds are obtained on adding a secondary phosphine sulfide to a Schiff base. The reaction proceeds according to the equation

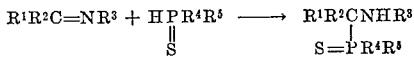

According to the kind of the substituents on the nitrogen atom or carbon atom, the Schiff bases are also called azomethines, aldehydimines, ketimines or aniles, and up to now no clear limitation has been formulated. Under the term secondary phosphine sulfides are comprised herein, as examples, also difunctional analogues of the general formula

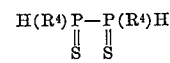

and

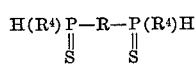

(R=divalent hydrocarbyl group or heterocyclic group). Similarly, difunctional Schiff bases can be used of the general formula

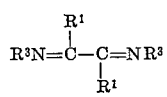

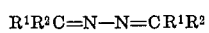

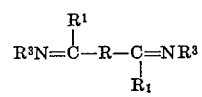

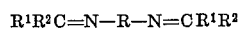

or analogous polymeric Schiff bases having a variety of C=N bonds can be used. These starting compounds are obtained in known manner by reacting an aldehyde, a ketone or an amine, which is at least divalent.

In carrying out the reaction, the reactants are heated in a solvent. As a rule, warming up the mixture to about 40° C. will be sufficient to cause the exothermic reaction. If necessary, one can also heat to a higher temperature, e.g. at 120° C. or higher. Suitable solvents are, e.g. ether, benzene and alcohol.

The novel compounds are oily to crystalline products. they are useful as lubricants, additives to lubricants, complexing agents, additives to detergents, biocidal agents like, e.g. fungicides and bactericides. The compounds displaying surface active properties contain preferably a higher alkyl group having about 12 to 18 carbon atoms whereas fungicidal and bactericidal properties will be provided by compounds having halogen atoms, nitro groups and/or ethylenically or acetylenically unsaturated groups.

EXAMPLE 1

To a suspension of 2.18 g. (0.01 mol) of diphenyl phosphine sulfide in 50 ml. of ether is slowly added the Schiff base $C_6H_5CH=NC_2H_5$, and the diphenyl phosphine sulfide goes into solution. On warming on the water bath, vigorous exothermic reaction ensues, which is complete after several minutes. Evaporating the ether and cooling the residue yields 3.1 g. (88.3%) of adduct possessing the formula $(C_6H_5)_2P(S)CH(C_6H_5)NHC_2H_5$; M.P. 158–159° C. (from methanol) $P^{31}$ chem. shift −48.8 p.p.m.

*Analysis.*—$C_{21}H_{22}NPS$ (251.4). Calc'd (percent): C, 71.77; H, 6.30; N, 3.98. Found (percent): C, 72.30; H, 6.62; N, 4.19.

EXAMPLE 2

A mixture of 2.13 g. (0.01 mol) of diphenyl phosphine sulfide and 1.9 g. (0.01 mol) of Schiff base p-$NO_2C_6H_4CH=NCH_2CH=CH_2$ in 70 ml. of ether is refluxed for 30 minutes. After evaporating the ether, there remains an oil which slowly crystallizes. Yield 3.63 g. (89%) of adduct of the formula

M.P. 110–111° C. (from ether/hexane).

*Analysis.*—$C_{22}H_{21}N_2O_2PS$ (408.45). Calc'd (percent): C, 64.69; H, 5.18; N, 6.85. Found (percent): C, 65.61; H, 5.48; N, 6.94.

EXAMPLE 3

From 1.22 g. (0.01 mol) of diethyl phosphine sulfide and 1.9 g. (0.01 mol) of Schiff base

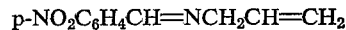

there is obtained on proceeding as in Example 1, an oily residue. The picrate is prepared for the identification. Yield 3.8 g. (70.4%) of adduct (as picrate) of the formula

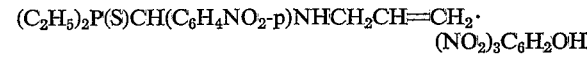

M.P. 131–133° C. (from alcohol/ether), $P^{31}$ chem. shift −61.1 p.p.m.

*Analysis.*—$C_{20}H_{24}N_5O_9PS$ (541.46). Calc'd (percent): C, 44.36; H, 4.46; N, 12.93. Found (percent): C, 45.21; H, 4.33; N, 12.48.

EXAMPLE 4

From 1.78 g. (0.01 mol) of di-n-butyl phosphine sulfide and 1.9 g. (0.01 mol) of Schiff base

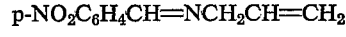

there is obtained, on proceeding as in Example 3, an oily residue. The picrate is prepared for the identification.

Yield 5.0 g. (83.6%) of adduct (as picrate) of the formula $(n\text{-}C_4H_9)_2P(S)CH(C_6H_4NO_2\text{-}p)NHCH_2CH=CH_2 \cdot (NO_2)_3C_6H_2OH$ M.P. 139–140° C. P$^{31}$ chem. shift −57.4 p.p.m.

*Analysis.*—C$_{24}$H$_{32}$N$_5$O$_9$PS (597.5). Calc'd (percent): C, 48.23; H, 5.39; N, 11.72. Found (percent): C. 49.16; H, 5.20; N, 11.48.

EXAMPLE 5

From 2.44 g. (0.02 mol) of diethyl phosphine sulfide and 4.28 g. (0.02 mol) of Schiff base m, $p\text{-}Cl_2C_6H_3CH=NCH_2CH=CH_2$ there is obtained, on proceeding as in Example 3, an oily residue. The picrate is prepared for the identification. Yield 7.5 g. (66.4%) of adduct (as picrate) of the formula $(C_2H_5)_2P(S)CH(C_6H_3Cl_2\text{-}m,p)NHCH_2CH=CH_2 \cdot (NO_2)_3C_6H_2OH$ M.P. 135–136° C. p$^{31}$ chem. shift−60.5 ppm.

*Analysis.*—C$_{20}$H$_{23}$Cl$_2$N$_4$O$_7$PS (565.35). Calc'd (percent: C, 42.48; H, 4.10; N, 9.91. Found (percent): C, 42.68; H, 4.57; N, 10.23.

EXAMPLE 6

From 3.56 g. (0.02 mol) of di-n-butyl phosphine sulfide and 4.28 g. (0.02 mol) of Schiff base $m,p\text{-}Cl_2C_6H_3CH=NCH_2CH=CH_2$ in 30 ml. of benzene, there is obtained, on proceeding as in Example 3, an oily residue. The picrate is prepared for the identification. Yield 7.5 g. (60.5%) of adduct (as picrate) of the formula $(n\text{-}C_4H_9)_2P(S)CH(C_6H_3Cl_2\text{-}m,p)NHCH_2CH=CH_2 \cdot (NO_2)_3C_6H_2OH$ M.P. 108–109° C. p$^{31}$ chem. shift −56.5 p.p.m.

*Analysis.*—C$_{24}$H$_{31}$Cl$_2$N$_4$O$_7$PS (621.45). Calc'd (percent): C, 46.38; H, 5.02; N, 9.01. Found (percent): C, 46.22; H, 5.04; N, 9.16.

What I claim is:
1. A compound of the formula

$$\begin{array}{c}(C_6H_3Cl_2=m,p)-HCNH(C_3H_5)\\|\\S=P(n=C_4H_9)_2\end{array}$$

References Cited

UNITED STATES PATENTS 3,332,987  7/1967  Popoff et al. _____ 260—502.5
3,442,948  5/1969  Wiley _____ 260—570.5

OTHER REFERENCES

Hoffman: "Chem. Ber.," vol. 95, pp. 2563–6 (1962).
Horner et al.: "Chem. Ber.," vol. 94, pp. 1323–6 (1961).
Houber-Weyl: "Methoden Der. Organischen Chemie.," vol. 12/1, pp. 155, 483, 487 and 574–75 (1963).
Issleib et al.: "Chemical Abstracts," vol. 63, p. 8400 (1965).

ROBERT V. HINES, Primary Examiner

U.S. Cl. X.R.

252—47, 106, 152; 260—566 (D), 566 (F), 606.5 (P), 999, 567.5